UNITED STATES PATENT OFFICE.

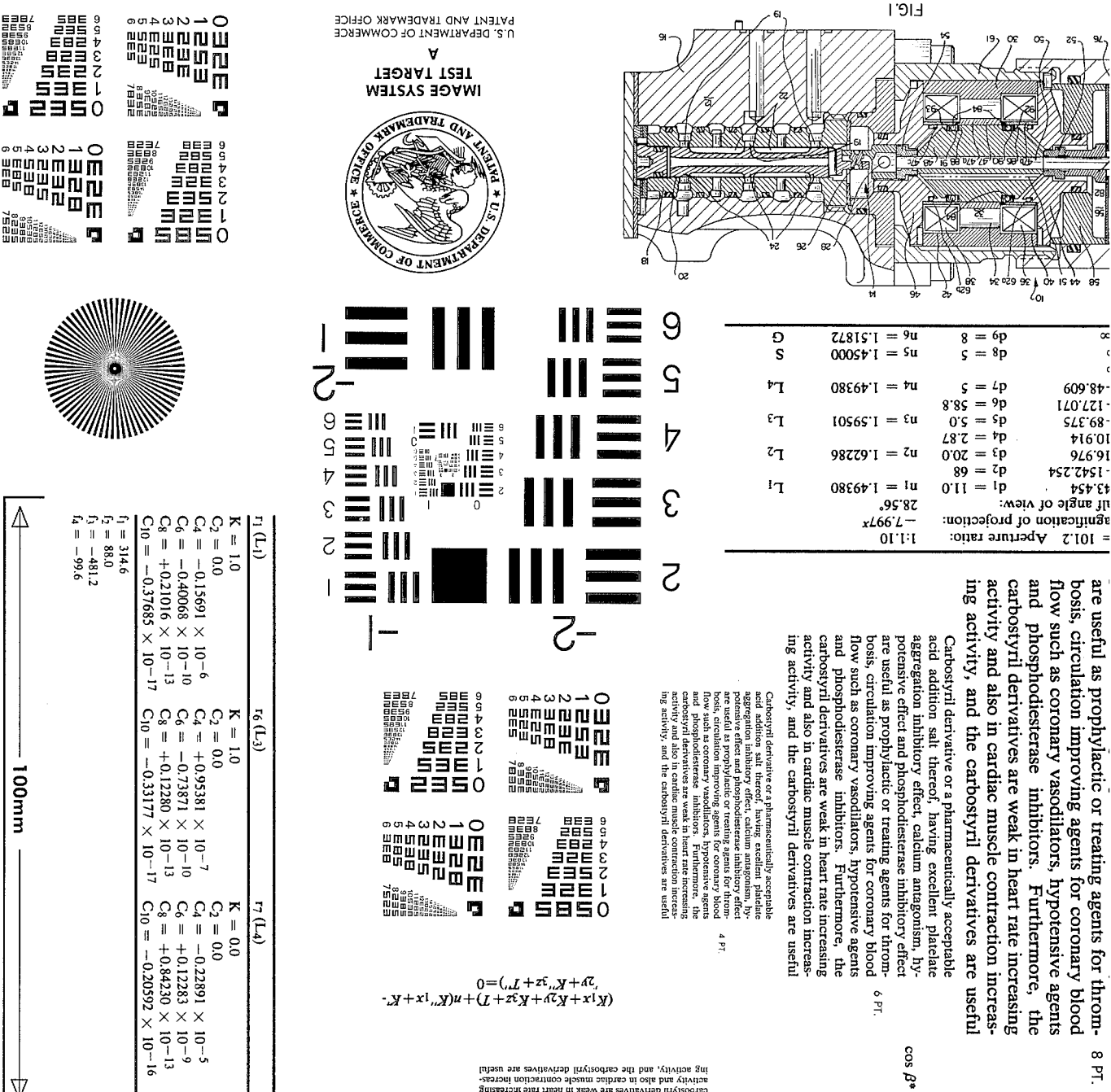

GEORGE BELL, OF ABINGDON, ILLINOIS.

ANIMAL-TRAP.

SPECIFICATION forming part of Letters Patent No. 659,783, dated October 16, 1900.

Application filed February 6, 1900. Serial No. 4,243. (No model.)

*To all whom it may concern:*

Be it known that I, GEORGE BELL, a citizen of the United States, residing at Abingdon, in the county of Knox and State of Illinois, have invented a new and useful Animal-Trap, of which the following is a specification.

The invention relates to improvements in animal-traps.

The object of the present invention is to improve the construction of animal-traps and to provide a simple, inexpensive, and efficient one designed especially for mice and capable of being tripped by the slightest depression of the bait-platform or trigger incident to an attempt to obtain the bait or to pass over the front portion of the trap.

The invention consists in the construction and novel combination and arrangement of parts hereinafter fully described, illustrated in the accompanying drawings, and pointed out in the claim hereto appended.

In the drawings, Figure 1 is a perspective view of an animal-trap constructed in accordance with this invention and shown set. Fig. 2 is a plan view, the trap being sprung. Fig. 3 is a detail perspective view of the base-plate. Fig. 4 is a similar view of the bait-platform or trigger.

Like numerals of reference designate corresponding parts in all the figures of the drawings.

1 designates a base-plate stamped or otherwise formed from a single piece of sheet metal and provided at opposite sides with upwardly-extending perforated ears located approximately opposite the center of the base-plate and receiving a transverse pintle 3, which supports a spring-actuated jaw 4 and hinges the same to the base-plate. The ears 2, which may be solid, are preferably split and open, as illustrated in Fig. 3, before the parts are assembled to facilitate assembling the same. The spring-actuated jaw 4, which is approximately rectangular, is composed of parallel sides and a straight transverse end portion, and it is located adjacent to the side edges of the base-plate, as illustrated in Fig. 2 of the accompanying drawings, when the trap is sprung. The front portion of the base-plate is slightly reduced by bending the edges thereof upward to form flanges 5 and 6, adapted to strengthen the base-plate and also to coöperate with the jaw in holding and engaging a mouse or other animal. The sides of the jaw are provided with eyes, through which a transverse pintle, which is constructed of wire, passes, and the terminals 7 of the pintle are bent at an angle, as illustrated in Fig. 2, to prevent the withdrawal of the wire. When the pintle is constructed of stout wire, its terminals may be bent at right angles before the parts are assembled, as the open ears (shown in Fig. 3) will permit the pintle to be readily arranged in them, and they may be easily closed after the parts are assembled. The jaw is actuated by a coiled spring 8, disposed on the pintle and arranged between the sides of a jaw, and it is provided at its ends with arms 9 and 10, engaging, respectively, the jaw and the rear portion of the base-plate. The arm 9, which engages one side of the jaw, has its terminal 11 bent laterally and slightly curved to prevent it from becoming accidentally disengaged from the jaws. When the jaw is swung backward, as illustrated in Fig. 1 of the accompanying drawings, to set the trap, the spring is tightened and is adapted to throw the jaw forward with great force when the trap is sprung, as will be readily apparent. The jaw is retained in the position shown in Fig. 1 by means of a lever 12 and a bait-platform or trigger 13 pivotally mounted at the front portion of the base-plate, as clearly illustrated in Fig. 1 of the drawings. The lever 12, which is approximately U-shaped, extends longitudinally of the base-plate, from the back thereof to a point slightly beyond the coiled spring, and its rear end is hinged or pivoted to the base-plate and its front end is adapted to be engaged by the bait-platform or trigger, as hereinafter explained. The rear terminals of the sides of the lever 12 are bent outward to form hook-shaped journals 14, which are arranged in perforated ears 15, struck up from the rear portion of the base-plate, as clearly shown in Fig. 1. The front portion of the base-plate is provided with a recess or cut-away portion 16, dividing the front flange 6 and enabling the front portion of the spring-actuated jaw to be readily grasped to set the trap.

The bait-platform or trigger 13 is constructed of a single piece of sheet metal, stamped

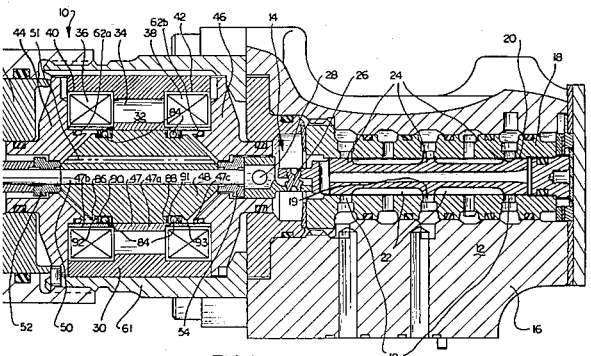
IMAGE SYSTEM TEST TARGET A
U.S. DEPARTMENT OF COMMERCE
PATENT AND TRADEMARK OFFICE